US008300648B2

(12) United States Patent
Anderson, IV

(10) Patent No.: US 8,300,648 B2
(45) Date of Patent: *Oct. 30, 2012

(54) SYSTEM, METHOD AND COMPUTER PROGRAM PRODUCT FOR RESIDENTIAL GATEWAY MONITORING AND CONTROL

(75) Inventor: Charles E. Anderson, IV, Woodstock, GA (US)

(73) Assignee: Broadcom Corporation, Irvine, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 12/263,412

(22) Filed: Oct. 31, 2008

(65) Prior Publication Data

US 2009/0059939 A1    Mar. 5, 2009

Related U.S. Application Data

(63) Continuation of application No. 10/289,386, filed on Nov. 7, 2002, now Pat. No. 7,460,546.

(51) Int. Cl.
*H04L 12/28* (2006.01)

(52) U.S. Cl. .......................... 370/401; 709/238

(58) Field of Classification Search .................. 370/401; 709/238
See application file for complete search history.

(56) References Cited

U.S. PATENT DOCUMENTS

| | | | |
|---|---|---|---|
| 5,148,545 A * | 9/1992 | Herbst et al. ................... | 710/240 |
| 5,577,115 A | 11/1996 | Deutsch et al. | |
| 5,991,292 A | 11/1999 | Focsaneanu et al. | |
| 6,229,810 B1 | 5/2001 | Gerszberg et al. | |
| 6,335,936 B1 | 1/2002 | Bossemeyer et al. | |
| 6,590,870 B1 * | 7/2003 | Mellberg ....................... | 370/249 |
| 7,460,546 B2 * | 12/2008 | Anderson, IV ................ | 370/401 |
| 2001/0055274 A1 | 12/2001 | Hegge et al. | |
| 2002/0073434 A1 | 6/2002 | Pience | |
| 2002/0083193 A1 * | 6/2002 | Terefenko ....................... | 709/238 |
| 2002/0150081 A1 | 10/2002 | Fang | |
| 2003/0058890 A1 * | 3/2003 | Ritchie et al. ................. | 370/486 |
| 2003/0133558 A1 * | 7/2003 | Kung et al. ............... | 379/215.01 |
| 2003/0217125 A1 | 11/2003 | Brancati et al. | |
| 2004/0003094 A1 | 1/2004 | See | |

FOREIGN PATENT DOCUMENTS

| | | |
|---|---|---|
| WO | WO 01/45396 A1 | 6/2001 |
| WO | WO 02/05114 A1 | 1/2002 |
| WO | WO 02/19717 A2 | 3/2002 |
| WO | WO 02/097997 A2 | 12/2002 |

OTHER PUBLICATIONS

European Search Report issued May 24, 2011 for EP Application No. 03 02 5693.

* cited by examiner

*Primary Examiner* — Robert Wilson
*Assistant Examiner* — Wei Zhao
(74) *Attorney, Agent, or Firm* — Sterne, Kessler, Goldstein & Fox P.L.L.C.

(57) ABSTRACT

A system, method and computer program product is provided that allows an end user to monitor and/or control various data streams appearing on one or more customer premises equipment (CPE) interfaces of a residential gateway, even where the data streams are of different types such as voice, video or computer data. The invention provides a user interface, implemented as part of a CPE device or as a stand-alone device, that is accessed by an end user to transmit commands to a residential gateway. A processor within the residential gateway executes gateway monitoring and control software that receives the commands and, in response, performs the necessary routing and conversion of data streams to execute the desired monitoring and/or control functions.

44 Claims, 9 Drawing Sheets

Figure 1A:
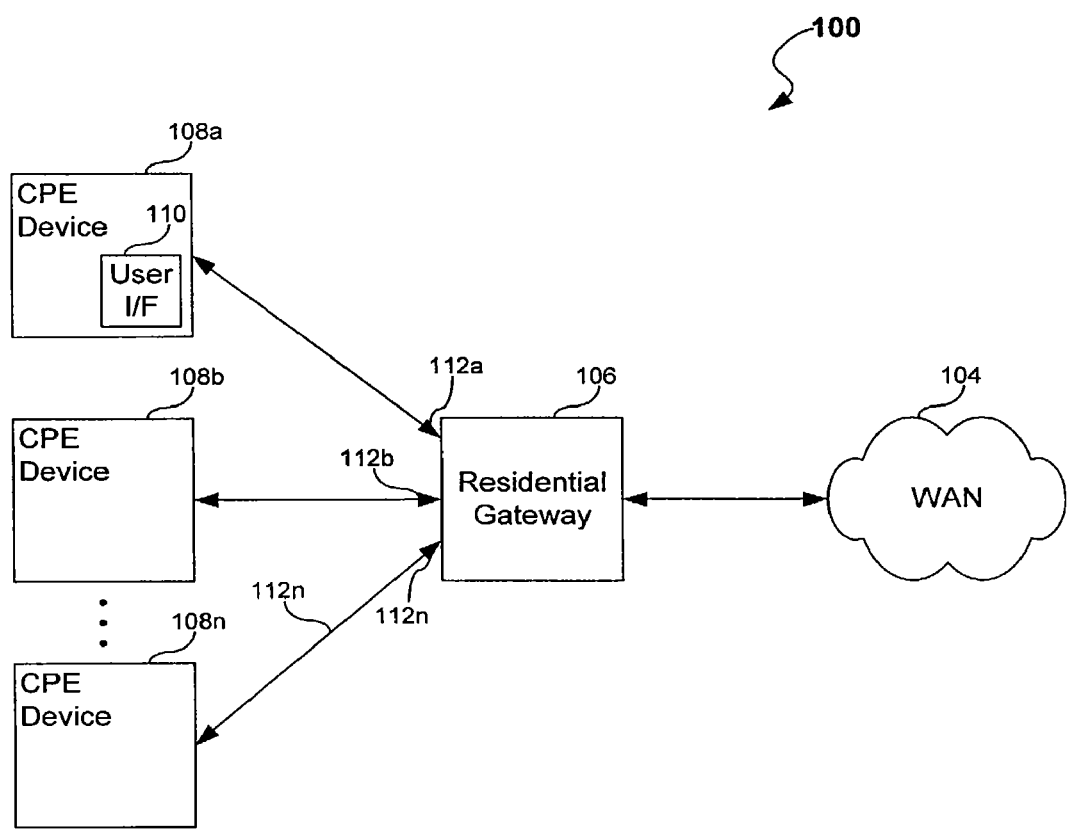

SYSTEM, METHOD AND COMPUTER PROGRAM PRODUCT FOR RESIDENTIAL GATEWAY MONITORING AND CONTROL

CROSS-REFERENCE TO RELATED APPLICATIONS

The present application is a continuation of U.S. patent application Ser. No. 10/289,386 filed on Nov. 7, 2002 (now U.S. Pat. No. 7,460,546), which is incorporated herein in its entirety by reference.

BACKGROUND OF THE INVENTION

1. Field of the Invention

The present invention is generally related to the monitoring and control of electronic information in a communication system. More particularly, the present invention is related to the monitoring and control of electronic information, such as voice, video, and data, that is provided from a wide area network (WAN) to one or more customer premises equipment (CPE) devices via a residential gateway.

2. Background

As used herein, the term "residential gateway" refers to an interface between a wide area network (WAN) and one or more local end user devices, also referred to as customer premises equipment (CPE) devices. Residential gateways operate as functional bridges between the external network and the CPE devices, receiving application-agnostic data from the external network, separating the data into various types, optionally reformatting it for a particular application, and distributing the data via one or more in-premises networks to one or more CPE devices. Each CPE device may consume the data in its raw format or perform additional transformations on the data prior to use. Data that is distributed by the gateway may include, but is not limited to, voice, video, and/or computer data.

Conventional residential gateway devices provide end users with only limited data monitoring and control functions. For example, conventional residential gateways permit some filtering of computer data for security and network management purposes, such as providing firewall and DHCP (Dynamic Host Configuration Protocol) services. These functions of the residential gateway are generally configured by the end user via a Web interface, which provides some visibility into the traditional computer data functions of the gateway device, as well as SNMP (Simple Network Management Protocol) network monitoring and control functions. In general, however, apart from the provisioning and control of computer data network services, no other function exists within these devices to control or monitor other application data types, such as voice or video.

Some conventional residential gateways include interfaces that convert voice and video data received from the WAN from an Internet Protocol (IP) format into a native format used by a CPE device, such as a telephone or television. Control of these interfaces may be provided via provisioning services from the network or from craft interfaces into the residential gateway, but in general this control is limited to "on/off" type functionality, such as mapping IP addresses to telephone numbers, or providing a video cutoff relay.

Various methods are known for monitoring and/or controlling application data for law enforcement and parental monitoring purposes. These methods are typically implemented as data logs and filters for Web content on computers, recording equipment for phones (generally only used by law enforcement agencies), or "V-chip" type technology for televisions. These implementations all either prevent data from reaching an end user and/or provide "after the fact" records of the data that was exchanged. No mechanism is provided for real-time monitoring or control of the data flows, with the possible exception of telephony services in a traditional circuit-switched environment using conventional "phone tap" equipment.

What is needed then is a system, method and computer program product that provides for real-time control and/or monitoring of data appearing on one or more CPE interfaces of a residential gateway, where the data includes voice, video and/or computer data. The desired system, method and computer program product should allow an end user to monitor, mix, and control data of various types, including voice, video and/or computer data, in real time.

BRIEF SUMMARY OF THE INVENTION

Embodiments of the present invention take advantage of the extended data display and manipulation capabilities of a new class of residential gateway devices, thereby permitting data types to be mixed, monitored, and controlled via one or more local (CPE-side) interfaces provided by a residential gateway.

A residential gateway in accordance with embodiments of the present invention includes a network interface (such as, but not limited to, a cable modem network or an xDSL network interface), a first customer premises equipment (CPE) interface, a second customer premises equipment (CPE) interface, and a processor coupled to the network interface, the first CPE interface and the second CPE interface. The processor is adapted to receive data from a network via the network interface, to generate from the data a first data stream of a first data type and a second data stream of a second data type, to provide the first data stream to a first customer premises equipment (CPE) device via the first CPE interface, and to provide the second data stream to a second customer premises equipment (CPE) device via the second CPE interface. The second data type is different from the first data type. For example, the first data type may comprise video signals and the second data type may comprise computer data, or vice versa. Alternately, the first data type may comprise computer data or video signals and the second data type may comprise voice information.

The processor is also adapted to receive a first command from the first CPE device via the first CPE interface and, in response to receiving the first command, to provide a copy of the second data stream to the first CPE device via the first CPE interface by multiplexing a copy of the second data stream with the first data stream. The processor may be further adapted to convert the copy of the second data stream to the first data type prior to multiplexing the copy of the second data stream with the first data stream.

In accordance with further embodiments of the present invention, the processor is further adapted to receive a second command from the first CPE device via the first CPE interface and, in response to receiving the second command, to cease providing the second data stream to the second CPE device via the second CPE interface. Alternately, in response to receiving the second command, the processor may be further adapted to provide a data stream to the second CPE device via the second CPE interface other than the second data stream.

In accordance with embodiments of the present invention, the above-described network monitoring and control functions may be implemented in software that is executed by the processor, in hardware, or in a combination of software and hardware.

Embodiments of the present invention are advantageous in that they enable real-time remote monitoring of data present on one or more CPE interfaces of a residential gateway, even where the data being monitored is of a different type than that normally received by the monitoring CPE device. By converting monitored data into a format appropriate for receipt by the monitoring CPE device, embodiments of the present invention enable multiplexing of data from disparate CPE interfaces of a residential gateway for delivery to a single user-friendly interface.

Embodiments of the present invention are also advantageous in that they permit real-time, discriminating, remote control of the data content allowed on multiple CPE interfaces of a residential gateway, including the ability to turn on/off data content, re-route data content, or filter data content based on user-defined parameters.

Embodiments of the present invention are further advantageous in that they may be implemented as an overlay to application software within existing multi-protocol residential gateway devices and customer premises equipment, thereby extending the functionality of these devices.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1B:
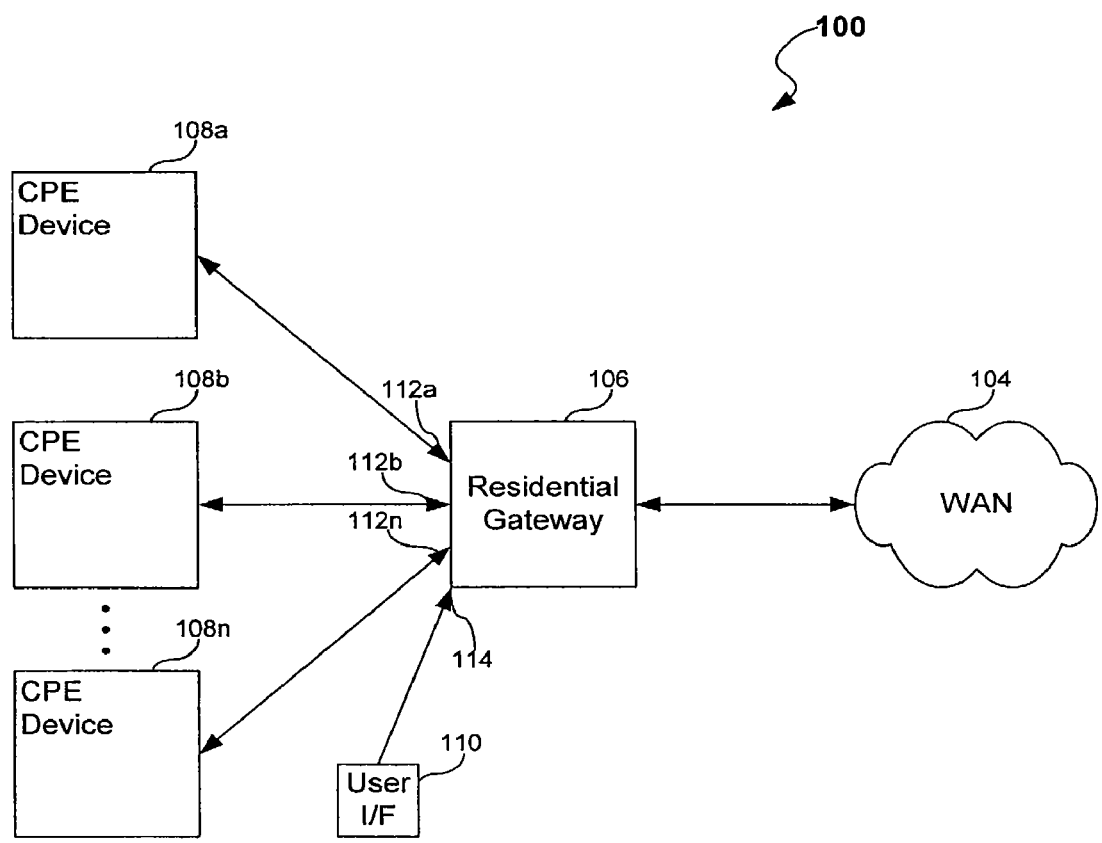

FIGS. 1A and 1B each depict a high-level block diagram of a system for residential gateway monitoring and control in accordance with an embodiment of the present invention.

Figure 2A:
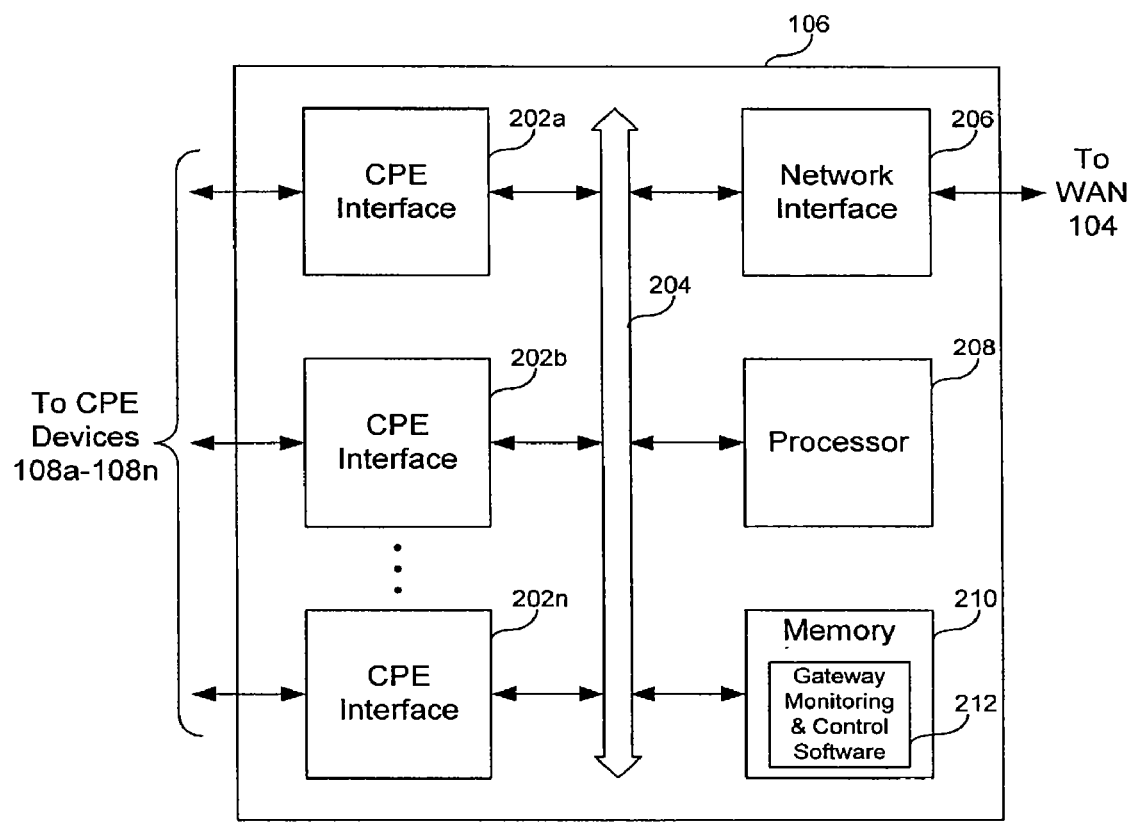
Figure 2B:
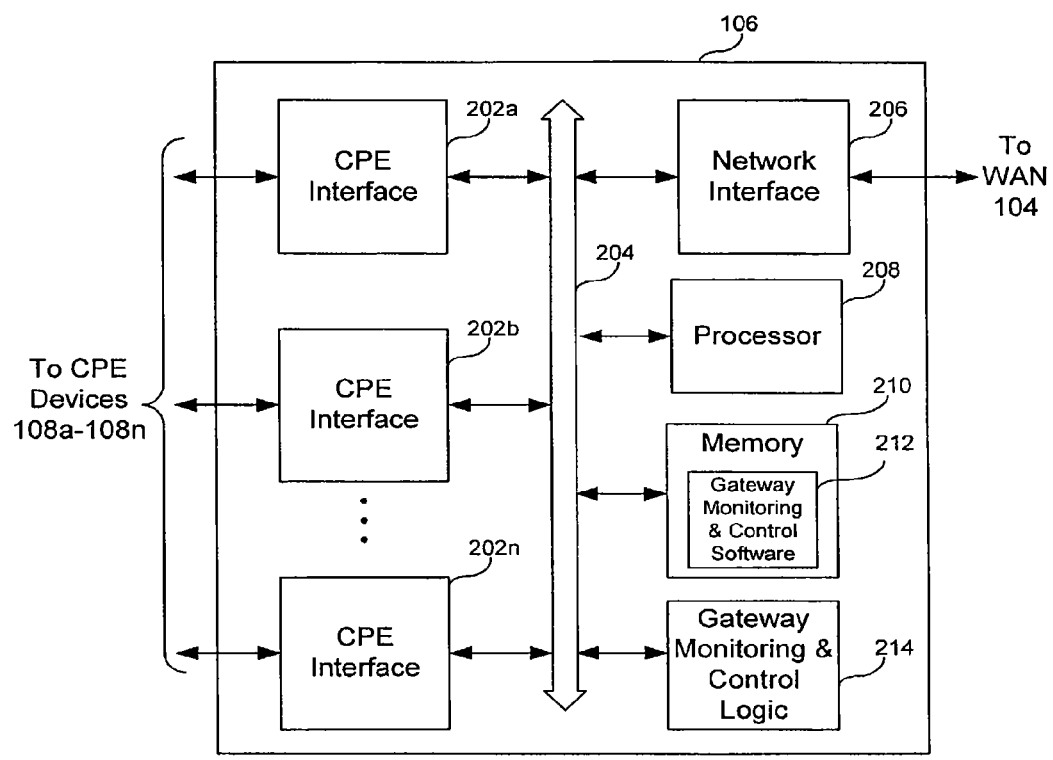

FIGS. 2A and 2B each depict an exemplary residential gateway in accordance with an embodiment of the present invention.

Figure 3:
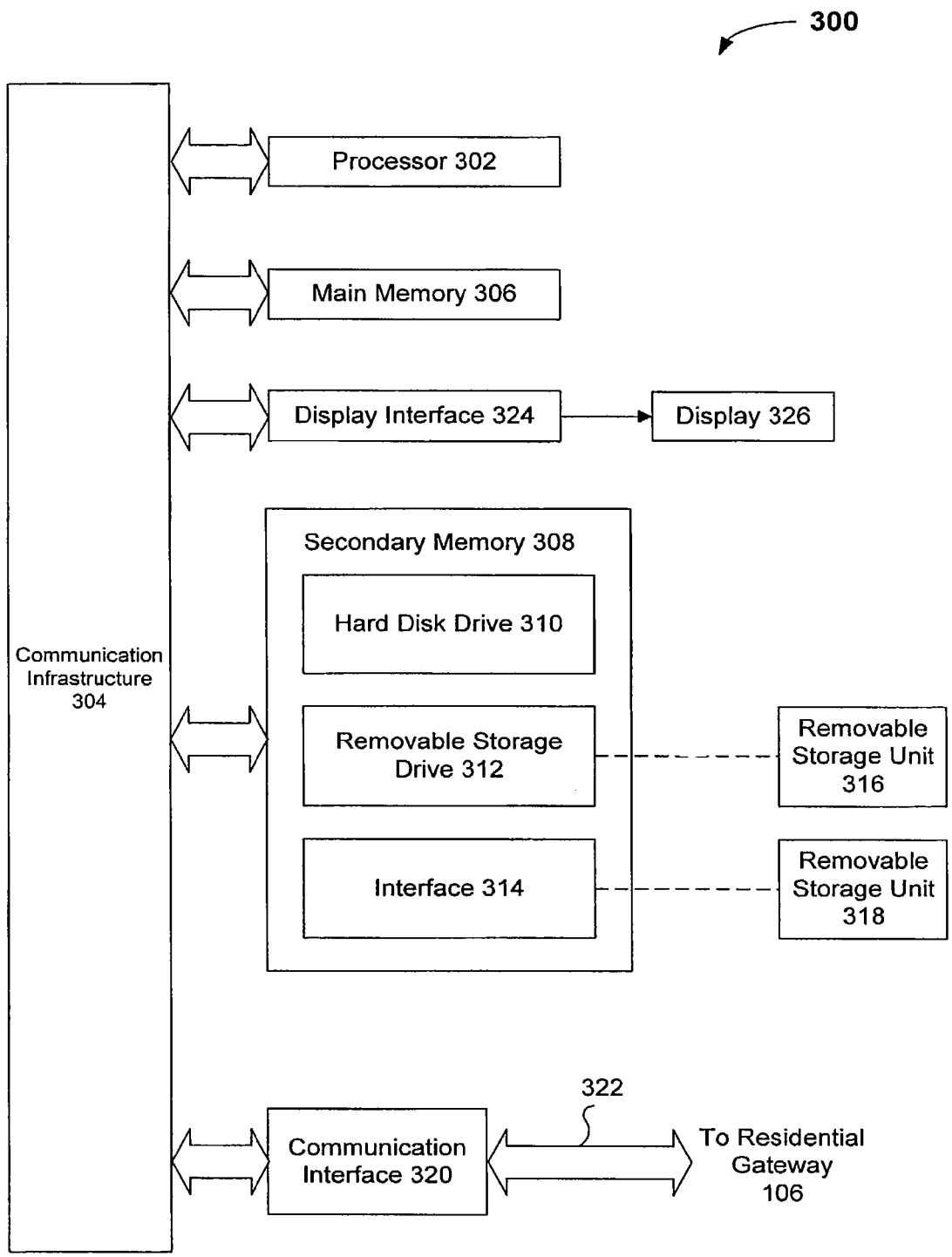

FIG. 3 depicts an exemplary customer premises equipment (CPE) device in accordance with an embodiment of the present invention.

Figure 4:
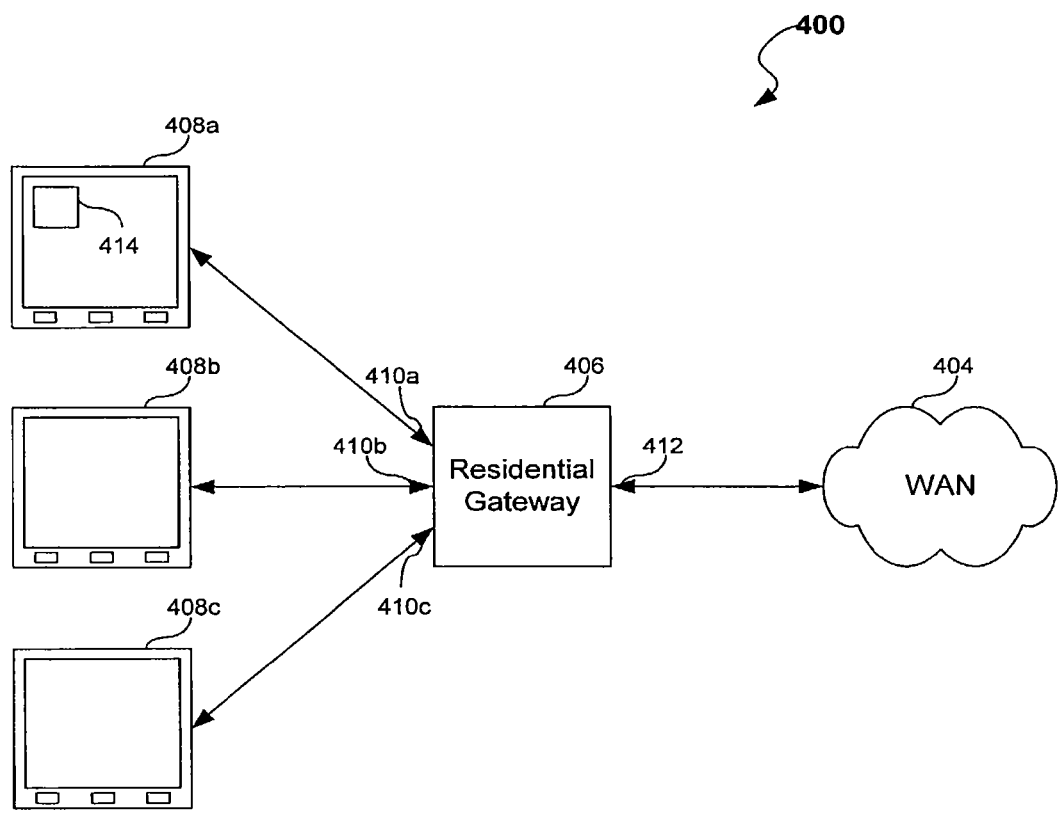
Figure 5:
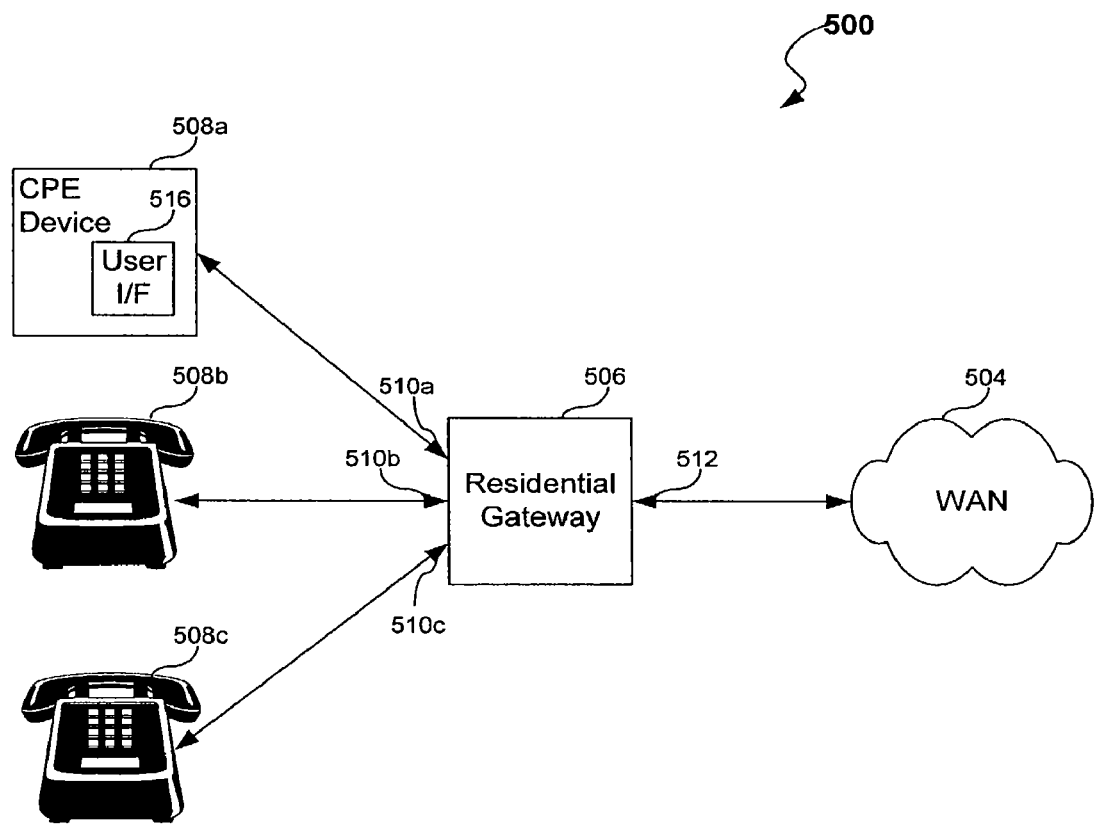
Figure 6:
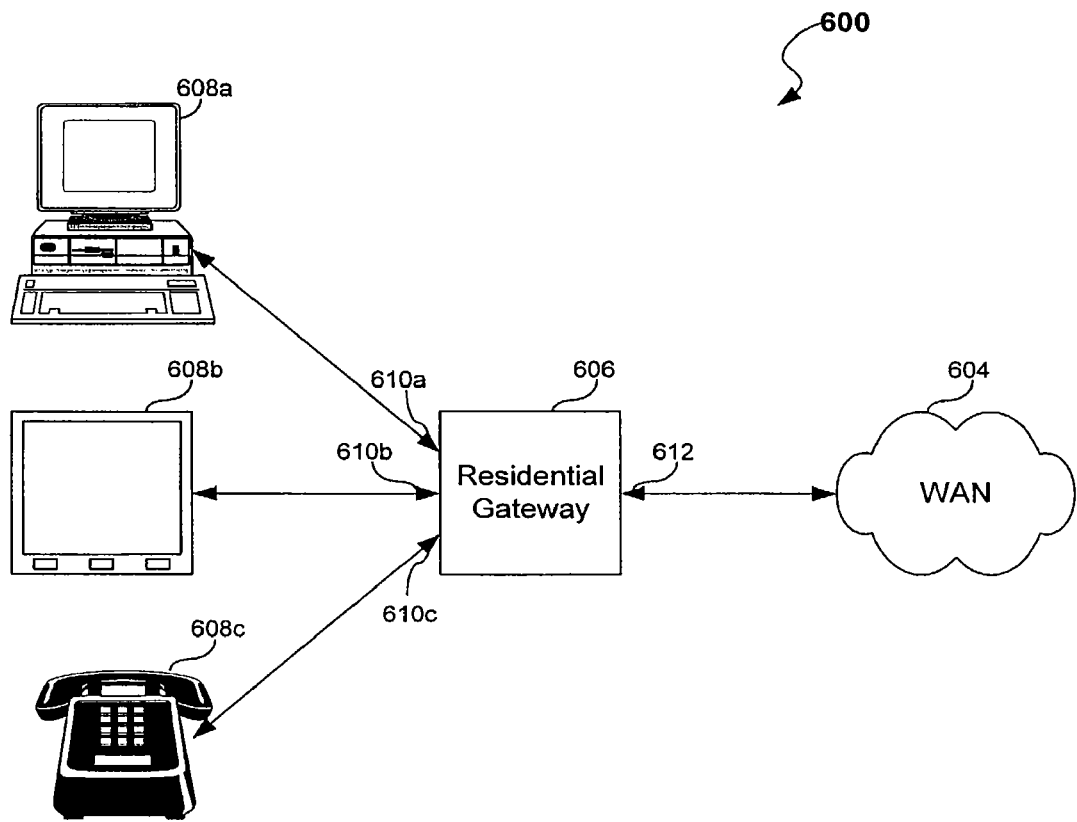

FIGS. 4, 5, and 6 each depict an exemplary system for residential gateway monitoring and control in accordance with an embodiment of the present invention.

Figure 7:
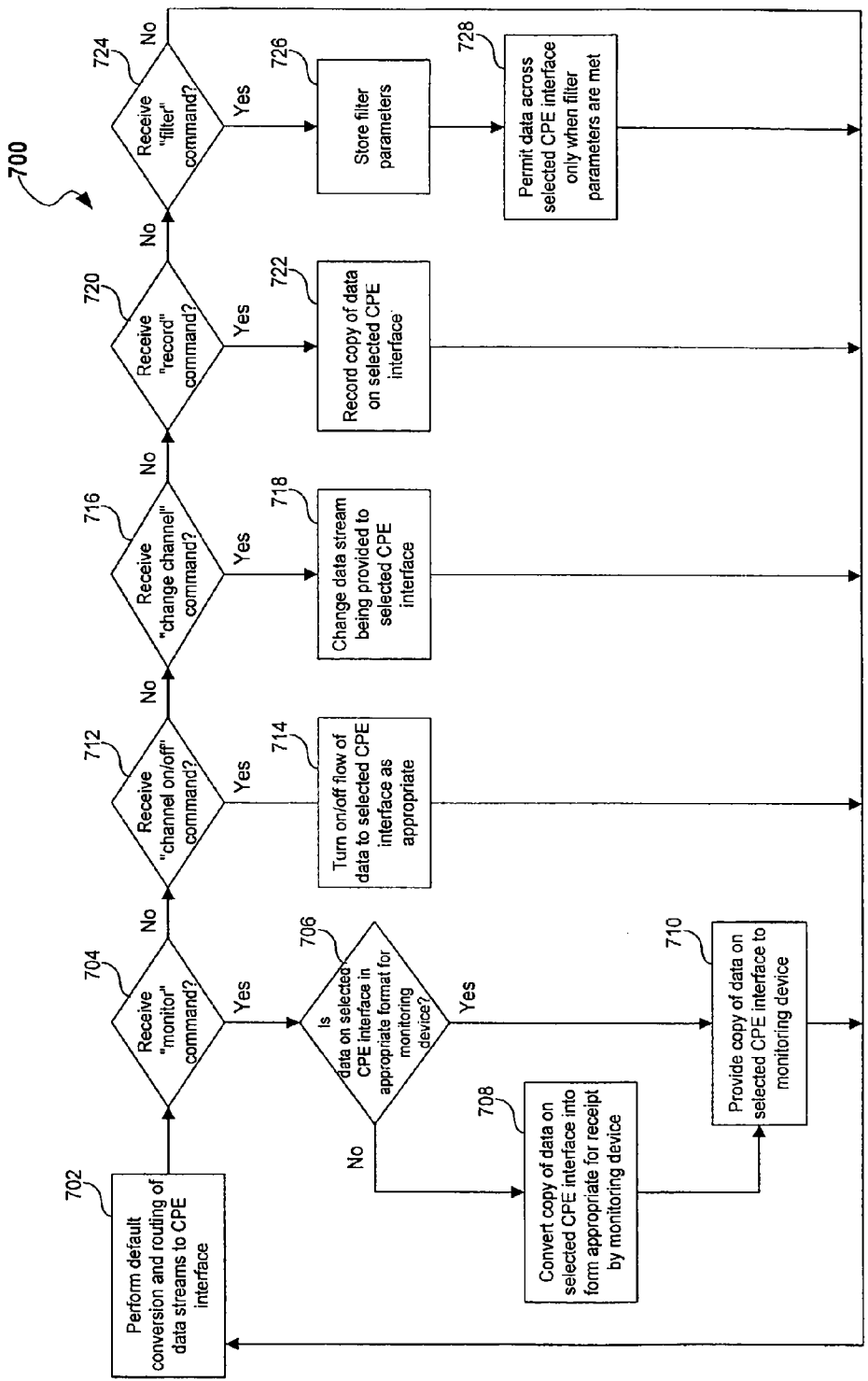

FIG. 7 depicts a flowchart of a method for residential gateway monitoring and control in accordance with an embodiment of the present invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

A. System Overview

FIG. 1A depicts a high-level block diagram of an exemplary system for residential gateway monitoring and control 100 in accordance with an embodiment of the present invention. As shown in FIG. 1, exemplary system 100A includes a residential gateway 106 that is communicatively coupled to a wide area network (WAN) 104. WAN 104 may comprise any type of data network or combination of data networks including, but not limited to, circuit switched and/or packet switched networks. For example, WAN 104 may comprise a cable modem network or an xDSL network. Additionally, WAN 104 may comprise a variety of transmission mediums including, but not limited to, twisted pair, coaxial cable, fiber-optic and/or wireless transmission mediums. In an example embodiment, WAN 104 includes the Internet.

As further depicted in FIG. 1A, residential gateway 106 is communicatively coupled to a plurality of customer premises equipment (CPE) devices 108a-108n via a plurality of corresponding CPE interfaces 112a-112n. Residential gateway 106 operates as an interface between WAN 104 and CPE devices 108a-108n, which may be also referred to herein as end user devices 108a-108n.

In particular, residential gateway 106 receives application-agnostic data from WAN 104, separates the data into various data types, optionally reformats it for a particular application, and selectively distributes it to one or more of CPE devices 108a-108n via corresponding CPE interfaces 112a-112n. CPE devices 108a-108n may include one or more computers, televisions, set-top boxes, VOIP (Voice Over Internet Protocol) phones, POTS (Plain Old Telephone System) phones, or other devices capable of receiving and processing data from WAN 104 via residential gateway 106. CPE devices 108a-108n may consume the data in its raw format or perform additional transformations on the data prior to use. Data types received and distributed by residential gateway 106 to CPE devices 108a-108n may include, but are not limited to, video, voice and computer data.

As will be discussed in more detail below, exemplary system 100 additionally provides a user interface 110 to residential gateway 106 that enables an end user to control, mix and/or monitor, in real time, data streams processed by residential gateway 106 for distribution to one or more of CPE devices 108a-108n. User interface 110 may be implemented as part of one or more of CPE devices 108a-108n or as a stand-alone device. For example, in the embodiment of system 100 depicted in FIG. 1A, user interface 110 comprises part of CPE device 108a, while in the embodiment of system 100 depicted in FIG. 1B, user interface 110 comprises a stand alone device with a dedicated interface 114 to residential gateway 106. In either case, user interface 110 is used by an end user to transmit commands to residential gateway 106. In response to receiving such commands, gateway monitoring and control software within residential gateway 106 causes residential gateway 106 to perform the monitoring and control functions of the present invention.

B. Exemplary Residential Gateway

FIG. 2A depicts a block diagram of an exemplary residential gateway 106. As discussed above in reference to FIGS. 1A and 1B, residential gateway 106 operates as an interface between an external WAN 104 and one or more CPE devices 108a-108n. In particular, residential gateway 106 facilitates the transfer of data streams of various types, such as video, voice and computer data, between WAN 104 and CPE devices 108a-108n.

As shown in FIG. 2A, residential gateway 106 includes a network interface 206, a plurality of CPE interfaces 202a-202n, at least one processor 208, and a memory 210, each of which are operatively and communicatively connected via a system bus 204. In one example, each of the components of residential gateway 106 comprise part of a single integrated circuit (IC), except for memory 210, which resides external to the IC and is coupled to system bus 204 by a corresponding interface, such as an expansion bus. However, this example is not intended to be limiting, and various configurations of the components of exemplary residential gateway 106 will be apparent to persons skilled in the relevant art(s).

Network interface 206 comprises the interface between residential gateway 106 and WAN 104. In part, network interface 206 implements the communication protocols necessary to receive data from WAN 104 for further processing by residential gateway 106. For example, in an embodiment in which WAN 104 comprises a cable modem network, network interface 206 may include a DOCSIS MAC and PHY for receiving and processing data in accordance with standard DOCSIS and/or EuroDOCSIS protocols.

Alternately, in an embodiment in which WAN 104 comprises an ADSL network, network interface 206 may include an ADSL analog front end (AFE) and transceiver for receiving and processing data in accordance with standard ADSL protocols. However, these examples are not limiting, and network interface 206 may include any interface for receiving data from WAN 104, including, without limitation, a V.90 or other V.xx analog modem interface, an HDSL interface, an RADSL interface, an ISDN interface, or a 10/100 Ethernet interface.

Once data has been received from WAN 104 via network interface 206, it is separated by data type into one or more channels, or data streams, of video, voice and/or computer data by network interface 206 and/or processor 208. Processor 208 then performs the necessary physical and link layer protocol conversions to transfer each data stream to one or more of CPE interfaces 202a-202n.

CPE interfaces 202a-202n each operate as an interface between residential gateway 106 and one or more CPE devices 108a-108n. In part, CPE interfaces 202a-202n implement the necessary communication protocols for transmitting data streams comprising video, voice or computer data from residential gateway 106 to one or more of CPE devices 108a-108n. For example, CPE interfaces 202a-202n may include a Home Phone Network Alliance (HPNA) interface, an Ethernet interface, and/or a Universal Serial Bus (USB) interface for communication with or more CPE devices over an HPNA network, an Ethernet, and/or a USB, respectively. CPE interfaces 202a-202n may also include a POTS interface for connecting to one or more POTS phones, or a video interface for providing video signals to a television, VCR or the like. However, these examples are not limiting, and CPE interfaces 202a-202n may comprise any interface suitable for communicating with one or more CPE devices 108a-108n, as will be appreciated by persons skilled in the relevant art(s).

Exemplary residential gateway 106 includes a processor 208 (although the present invention is also applicable to multi-processor residential gateways) that operates under the control of software stored in memory 210. In an embodiment, memory 210 includes a non-volatile memory, such as a flash memory, for storing program instructions that control the operation of processor 208, as well as a volatile memory, such as a high-speed SDRAM, that comprises the execution memory space for processor 208 and provides a buffer for the temporary storage of data. This volatile memory device may also be used to store program instructions that control the operation of processor 208. Memory 210, or a computer useable medium that carries software instructions for installation in memory 210, comprises a "computer program product," as that term is used elsewhere herein.

In accordance with the present invention, memory 210 stores gateway monitoring and control software 212 that is executed by processor 208 and that enables processor 208 to be responsive to commands received from an external user interface 110, which was initially described in reference to FIGS. 1A and 1B, above. Such commands may be received by residential gateway 106 over one or more of CPE interfaces 202a-202n, or over a dedicated interface (not shown in FIG. 2A) that is communicatively coupled to system bus 204. As will be discussed in more detail below, in response to such commands, gateway monitoring and control software 212 causes processor 208 to mix, monitor, and/or control one or more of the data streams distributed by residential gateway 106 via CPE interfaces 202a-202n.

In an alternate embodiment of residential gateway 106 illustrated in FIG. 2B, the gateway monitoring and control functions of the present invention as discussed herein are implemented by gateway monitoring and control software 212 operating in conjunction with gateway monitoring and control logic 214. For example, in an embodiment, gateway monitoring and control logic 214 comprises dedicated hardware for performing complex data stream transformation and mixing functions necessary to carry out the monitoring and control features of the present invention.

In an exemplary embodiment, the present invention may be implemented in a BCM3360 High-Performance Advanced PHY Broadband Gateway Cable Modem, manufactured by Broadcom Corporation of Irvine, Calif. In an alternate exemplary embodiment, the present invention may be implemented in a BCM6345 Single-Chip ADSL CPE Modem, also manufactured by Broadcom Corporation of Irvine, Calif. However, these examples are not limiting. As will be appreciated by persons skilled in the relevant art(s) from the teachings provided herein, the present invention may be implemented a wide variety of residential gateways.

C. Example CPE Device

FIG. 3 is a high-level block diagram of a computer system 300, which is only one example of a CPE device 108a-108n that may be implemented in a system in accordance with the present invention. As shown in FIG. 3, computer system 300 includes a processor 302 for executing software routines. Although only a single processor is shown for the sake of clarity, computer system 300 may also comprise a multi-processor system. Processor 302 is connected to a communication infrastructure 304 for communication with other components of computer system 300. Communication infrastructure 304 may comprise, for example, a communications bus, cross-bar, or network.

Computer system 300 further includes a main memory 306, such as a random access memory (RAM), and a secondary memory 308. Secondary memory 308 may include, for example, a hard disk drive 310 and/or a removable storage drive 312, which may comprise a floppy disk drive, a magnetic tape drive, an optical disk drive, or the like. Removable storage drive 312 reads from and/or writes to a removable storage unit 316 in a well known manner. Removable storage unit 316 may comprise a floppy disk, magnetic tape, optical disk, or the like, which is read by and written to by removable storage drive 312. As will be appreciated by persons skilled in the art, removable storage unit 316 includes a computer usable storage medium having stored therein computer software and/or data.

In alternative embodiments, secondary memory 308 may include other similar means for allowing computer programs or other instructions to be loaded into computer system 300. Such means can include, for example, a removable storage unit 318 and an interface 314. Examples of a removable storage unit 318 and interface 314 include a program cartridge and cartridge interface (such as that found in video game console devices), a removable memory chip (such as an EPROM, or PROM) and associated socket, and other removable storage units 318 and interfaces 314 which allow software and data to be transferred from removable storage unit 318 to computer system 300.

Computer system 300 further includes a display interface 324 that forwards graphics, text, and other data from the communication infrastructure 304 or from a frame buffer (not shown) for display to a user on a display unit 326.

Computer system 300 also includes a communication interface 320. Communication interface 320 allows software and data to be transferred between computer system 300 and external devices via a communication path 322. In an embodiment of the present invention, communication interface 300 permits data to be communicated between computer system 300 and a residential gateway 106 over communication path 322. Communication interface 320 may comprise an HPNA interface for communicating over an HPNA network, an Ethernet interface for communicating over an Ethernet, or a USB interface for communicating over a USB. However, these examples are not limiting, and any communication interface 320 and any suitable communication path 322 may be used to transfer data between computer system 300 and residential gateway 106.

As used herein, the term "computer program product" may refer, in part, to removable storage unit 316, removable storage unit 318, a hard disk installed in hard disk drive 310, or a carrier wave carrying software over communication path 322 (wireless link or cable) to communication interface 320. A computer useable medium can include magnetic media, optical media, or other recordable media, or media that transmits a carrier wave or other signal. These computer program products are means for providing software to computer system 300.

Computer programs (also called computer control logic) are stored in main memory 306 and/or secondary memory 308, and are executed by the processor 302. Computer programs can also be received via communications interface 320. In an embodiment of the present invention, user interface 110 comprises a computer program executed by processor 302 of computer system 300.

The computer system 300 may comprise a personal computer operating under the Microsoft WINDOWS operating system. However, this example is not limiting. As will be appreciated by persons skilled in the relevant art(s) from the teachings provided herein, a wide variety of other computer systems 300, and CPE devices 108a-108n, may be utilized to practice the present invention.

D. User Interface

A system in accordance with the present invention comprises an intuitive and user-friendly user interface 110 that permits an end user to control, mix and/or monitor one or more data streams distributed by residential gateway 106 over CPE interfaces 202a-202n. User interface 110 preferably comprises a menu-driven graphical user interface (GUI) that is easily accessed and controlled by an end user.

In one embodiment, user interface 110 comprises part of a CPE device attached to residential gateway 106. For example, user interface 110 may comprise a Web interface that is resident on a computer or Internet-capable television that is communicatively coupled to residential gateway 106. Alternately, user interface 110 may comprise a proprietary software application implemented and accessed on a CPE device such as a personal computer, television, telephone, or other CPE device.

User interface 110 may also be implemented as a stand-alone device with a dedicated communication link to residential gateway 106, rather than as part of a CPE device For example, in accordance with such an embodiment, user interface 110 may comprise a craft interface that is communicatively coupled to residential gateway 106 via a serial port or other dedicated interface.

E. Residential Gateway Monitoring and Control

Table 1, below, illustrates several example user interface commands. Each of the commands enable a user to monitor and/or control, in real-time, various data streams present on one or more of the CPE interfaces of residential gateway 106. These commands are selected for execution by an end user through interaction with user interface 110. Once selected, the commands are transmitted from user interface 110 to residential gateway 106, where they are received and processed by gateway monitoring and control software 212, which is stored in memory 210 and executed by processor 208. In response to receiving each command, gateway monitoring and control software 212 causes residential gateway 106 to perform the corresponding function described in Table 1. The example commands listed in Table 1 are provided by way of example only and are not intended to limit the present invention

TABLE 1

| User Interface Command | Function |
| --- | --- |
| MONITOR | receive copy of data stream being provided to selected CPE interface(s) of residential gateway |
| CHANNEL ON/OFF | turn on or off data stream being provided to selected CPE interface(s) of residential gateway |
| CHANGE CHANNEL | change data stream being provided to selected CPE interface(s) of residential gateway from a first data stream to a second data stream |
| RECORD | record data stream being provided to selected CPE interface(s) of residential gateway |
| FILTER | provide data stream to selected CPE interface(s) of residential gateway only when filter parameters are met |

As shown in Table 1, user interface 110 provides a "monitor" command, which permits an end user to selectively receive a copy of a data stream being provided to one or more of CPE interfaces 202a-202n of residential gateway 106, a "channel on/off" command that permits an end user to selectively turn on or off the provision of a data stream to one or more of CPE interfaces 202a-202n of residential gateway 106, a "change channel" command that permits an end user to selectively change the data stream being provided to one or more of CPE interfaces 202a-202n of residential gateway 106 from a first data stream to a second data stream, a "record" command that permits an end user to selectively record a data stream being provided to one or more of CPE interfaces 202a-202n to a memory device (for example, a hard disk drive) that may be coupled to residential gateway 106, and a "filter" command that permits an end user to selectively provide a data stream to one or more of CPE interface 202a-202n only when certain user-defined filter parameters are met.

Examples of the use of the above-referenced user interface commands will now be provided with reference to example embodiments of FIGS. 4, 5 and 6. Note that in the following examples, although reference is made to gateway monitoring and control software, the features of the present invention may also be implemented using hardware or a combination of software and hardware, such as the combination of gateway monitoring and control software 212 and gateway monitoring and control logic 214 described above in reference to FIG. 2B.

FIG. 4 depicts a high-level block diagram of a system 400 for residential gateway monitoring and control in accordance with an embodiment of the present invention. System 400 includes a residential gateway 406 that is coupled to a WAN 404 via a network interface 412 and to three televisions 408*a*, 408*b* and 408*c* via corresponding video interfaces 410*a*, 410*b* and 410*c*. In a default operating mode, residential gateway 406 receives a stream of data from WAN 404 and separates it into three different video channels, each of which is routed to a different one of televisions 408*a*, 408*b*, and 408*c* via corresponding video interfaces 410*a*, 410*b*, and 410*c*. Video information may be received from WAN 104 as optical signals, analog signals, or digital data packets.

In accordance with this example, television 408*a* includes a user interface in accordance with the present invention (not shown in FIG. 4). An end user of television 408*a* may, therefore, transmit user interface commands to residential gateway 406 via video interface 410*a*.

For example, the end user of television 408*a* may transmit a "monitor" command to residential gateway 406 to selectively receive a copy of the video signal currently being provided to television 408*b* and/or television 408*c*. Gateway monitoring and control software within residential gateway 406 will respond to the "monitor" command by causing residential gateway 406 to multiplex a copy of the video signal currently being provided to television 408*b* and/or television 408*c* with the video signal currently being provided to television 408*a*. Television 408*a* may then display the additional video signal(s), for example, in one or more "picture-in-picture" windows 410 generated by a picture-in-picture generator within television 408*a* for monitoring by the end user. Such an application may be useful for parents seeking to perform real-time monitoring of the type of programming being viewed by their children on a different television elsewhere in the home.

Should the end user of television 408*a* wish to terminate the video signal being sent to television 410*b* or television 410*c*, the end user may transmit a "channel off" command to residential gateway 406 to selectively turn off the video signal being provided to television 410*b* and/or television 410*c*. Gateway monitoring and control software within residential gateway 406 will respond to the "channel off" command by causing residential gateway 406 to cease providing the video signal currently being provided to television 408*b* and/or television 408*c* as selected by the end user. This may be desirable, for example, where a parent has determined that video content being viewed by their children on a different television elsewhere in the home is not suitable.

Alternatively, the end user of television 408*a* may transmit a "change channel" command to residential gateway 406 to selectively change the video signal currently being provided to any of televisions 408*a*, 408*b* and/or 408*c* to a video signal being provided to a different television. For example, the end user may transmit a "change channel" command to change the video signal being provided to television 408*b* to that being provided to television 408*c*. In response, gateway monitoring and control software within residential gateway 406 will cause residential gateway 406 to cease providing the video signal currently being provided to television 408*b* and, instead, provide a copy of the video signal currently being provided to television 408*c* to television 408*b*.

Furthermore, in an embodiment in which residential gateway 406 is coupled to a memory device such as a hard disk drive (not shown in FIG. 4), the end user may transmit a "record" command to residential gateway 406 to selectively record the video signal being provided to any of the televisions 408*a*, 408*b* or 408*c*. In response, gateway monitoring and control software within residential gateway 406 will cause residential gateway 406 to record a copy of the video signal being provided to television 408*a*, 408*b* or 408*c*, as selected by the end user, to the memory device.

FIG. 5 depicts a high-level block diagram of a system 500 for residential gateway monitoring and control in accordance with an alternate embodiment of the present invention. System 500 includes a residential gateway 506 that is coupled to a WAN 504 via a network interface 512 and to three CPE devices 508*a*, 508*b* and 508*c* via corresponding CPE interfaces 510*a*, 510*b* and 510*c*. CPE devices 508*b* and 508*c* comprise telephones that support either VOIP or POTS telephony, while CPE device 508*a* may comprise any type of CPE device including but not limited to a computer, television, set-top box, or a telephone similar to telephones 508*b* and 508*c*.

In a default operating mode, residential gateway 506 maintains a first voice channel for carrying analog or digital voice information to and from telephone 508*b* via voice interface 510*b* and a second voice channel for carrying analog or digital voice information to and from telephone 508*c* via voice interface 510*c*. Voice information received from each telephone by residential gateway 506 is optionally reformatted, then multiplexed with other data intended for WAN 504 and transmitted out of residential gateway 506 via network interface 512. Voice data received from WAN 504 by residential gateway 506 is separated, or de-multiplexed, into the first and second voice channels, optionally reformatted, and then routed to the two telephones 508*b* or 508*c* as appropriate.

As shown in FIG. 5, CPE device 508*a* includes a user interface 516 in accordance with the present invention. An end user of CPE device 508*a* may, therefore, transmit user interface commands to residential gateway 506 via CPE interface 510*a*.

For example, the end user of CPE device 508*a* may transmit a "filter" command to residential gateway 506 to selectively permit voice information to be exchanged between residential gateway 506 and telephones 508*b* and/or 508*c* only when certain filter parameters are met. For example, the filter parameters may comprise a "call list" of telephone numbers that telephone 508*b* and/or telephone 508*c* are permitted to send and/or receive calls from. In response to receiving the "filter" command, gateway monitoring and control software within residential gateway 506 will cause residential gateway 506 to maintain a voice channel to telephone 508*b* and/or telephone 508*c* only if the channel is carrying voice information associated with a call to or from a telephone number on the "call list."

Alternatively, the end user of CPE device 508*a* may transmit a "change channel" command to residential gateway 506 to selectively change the voice channel currently being provided to telephones 508*b* and/or 508*c*. For example, the end user may transmit a "change channel" command to change the voice channel currently being provided to telephone 508*b* to that currently being provided to telephone 508*c* and to change the voice channel currently being provided to telephone 508*c* to that currently being provided to telephone 508*b*. In response, gateway monitoring and control software within residential gateway 506 will cause residential gateway 506 to switch the voice channels currently being provided to telephones 508*b* and 508*c*. In this way, the present invention provides an end user with telephone switching capability.

Furthermore, in an embodiment in which residential gateway 506 is coupled to a memory device such as a hard disk drive (not shown in FIG. 5), the end user may transmit a "record" command to residential gateway 506 to selectively record the voice information that is sent to or received from any of the telephones 508b or 508c. In response, gateway monitoring and control software within residential gateway 506 will cause residential gateway 506 to selectively record a copy of the voice information being exchanged with telephone 508b or 508c as selected by the end user.

FIG. 6 depicts a high-level block diagram of a system 600 for residential gateway monitoring and control in accordance with a further embodiment of the present invention. System 600 includes a residential gateway 606 that is coupled to a WAN 604 via a network interface 612 and to three CPE devices 608a, 608b and 608c via corresponding CPE interfaces 610a, 610b and 610c. In accordance with this example, CPE device 608a represents a computer system that is adapted to receive computer data from residential gateway 606, CPE device 608b represents a television that is adapted to receive video signals from residential gateway 606, and CPE device 608c represents a telephone (VOIP or POTS) that is adapted to receive analog or digital voice information from residential gateway 606.

In a default operating mode, residential gateway 606 exchanges computer data with computer 608a via a computer interface 610a, distributes video signals received from WAN 604 to television 608b via a video interface 610b, and exchanges voice information with telephone 608c via a telephony interface 610c.

In accordance with this example, computer 608a includes a user interface in accordance with the present invention. An end user of computer 608a may, therefore, transmit user interface commands to residential gateway 606 via computer interface 610a.

For example, the end user of computer 608a may transmit a "monitor" command to residential gateway 606 to selectively receive a copy of the video signal currently being provided to television 608b or a copy of the voice information currently being exchanged between telephone 610c and residential gateway 606. However, because the requested video and/or voice information may not be in a format suitable for transmission over the computer interface 610a, the gateway monitoring and control software within residential gateway 606 will respond to the "monitor" command by first causing a copy of the requested data to be converted into a format appropriate for transmission across data interface 610a before providing it to computer 608a. The necessary techniques for performing such conversions are well known to persons skilled in the relevant art(s).

Similarly, in an embodiment in which the user interface comprises part of television 608b, the end user of television 608b may transmit a "monitor" command to residential gateway 606 to selectively receive a copy of the computer data currently being exchanged between computer 608a and residential gateway 606 or the voice information currently being exchanged between telephone 610c and residential gateway 606. However, because the requested computer data and/or voice information may not be in a format suitable for transmission over the video interface 610b, the gateway monitoring and control software within residential gateway 606 will respond to the "monitor" command by first causing a copy of the requested data to be converted into a format appropriate for transmission across data interface 610b before providing it to television 608b. The necessary techniques for performing such conversions are well known to persons skilled in the relevant art(s).

FIG. 7 depicts a flowchart 700 of a method for residential gateway monitoring and control in accordance with the present invention. The invention, however, is not limited to the description provided by the flowchart 700. Rather, it will be apparent to persons skilled in the relevant art(s) from the teachings provided herein that other functional flows are within the scope and spirit of the present invention. For the sake of clarity, flowchart 700 will be described with continued reference to the example residential gateway 106 of FIG. 2A. However, the invention is not limited to that embodiment. For example, although reference is made to gateway monitoring and control software 212, the features of the present invention may also be implemented in hardware or a combination of software and hardware, such as the combination of gateway monitoring and control software 212 and gateway monitoring and control logic 214 described above in reference to FIG. 2B.

The method of flowchart 700 begins at step 702, during which residential gateway 106 performs routing of data streams from WAN 104 to various CPE interfaces 202a-202n, and all necessary data conversions, in accordance with a default configuration. This default configuration may represent a mapping of data streams to CPE interfaces that is configured automatically during initialization of residential gateway 106, or may simply represent the most current mapping of data streams to CPE interfaces as configured by the end user via user interface 110.

At step 704, gateway monitoring and control software 212 within network gateway 106 determines if a "monitor" command has been received from user interface 110. As shown at step 706, if a "monitor" command has been received, gateway monitoring and control software 212 determines if a CPE interface selected for monitoring by the "monitor" command transfers data in a format that is appropriate for receipt by the monitoring device. If so, gateway monitoring and control software 212 causes residential gateway 106 to provide a copy of the data on the selected CPE interface to the monitoring device, as shown at step 710. If not, gateway monitoring and control software 212 causes residential gateway 106 to convert a copy of the data on the selected CPE interface to a format that is appropriate for receipt by the monitoring device, as shown at step 708, before providing a copy of the data to the monitoring device at step 710. The copy of the data from the selected CPE interface is multiplexed with the data stream currently being provided to the monitoring device for receipt by the monitoring device. Control then returns to step 702.

Returning to step 704, if gateway monitoring and control software 212 determines that a "monitor" command has not been received from user interface 110, control passes to step 712. At step 712, gateway monitoring and control software 712 determines if a "channel on/off" command has been received from user interface 110. As shown at step 714, if a "channel on/off" command has been received, gateway monitoring and control software 212 turns on or off the flow of data to a CPE interface selected by the "channel on/off" command, as indicated by the command. Control then returns to step 702.

Returning to step 712, if gateway monitoring and control software 212 determines that a "channel on/off" command has not been received from user interface 110, control passes to step 716. At step 716, gateway monitoring and control software 716 determines if a "change channel" command has been received from user interface 110. As shown at step 718, if a "change channel" command has been received, gateway monitoring and control software 212 changes the data stream being provided to the CPE interface selected by the "change channel" command from a first data stream to a second data stream as indicated by the command. Control then returns to step 702.

Returning to step 716, if gateway monitoring and control software 212 determines that a "channel on/off" command has not been received from user interface 110, control passes to step 720. At step 720, gateway monitoring and control software 212 determines if a "record" command has been received from user interface 110. As shown at step 722, if a "record" command has been received, gateway monitoring and control software 212 records a copy of the data on a CPE interface selected by the "record" command to a memory device, such as a hard disk drive, coupled to residential gateway 106. Control then returns to step 702.

Returning to step 720, if gateway monitoring and control software 212 determines that a "record" command has not been received from user interface 110, control passes to step 724. At step 724, gateway monitoring and control software 212 determines if a "filter" command has been received from user interface 110. As shown at step 726, if a "filter" command has been received, residential gateway monitoring and control software 212 stores corresponding filter parameters as selected by the end user via user interface 110. At step 728, residential gateway monitoring and control software 212 then monitors the data on the CPE interface selected by the "filter" command. If the data on the selected CPE interface satisfies the filter parameters, then residential gateway monitoring and control software 212 will permit that data to be communicated via the selected CPE interface; if the filter parameters are not met, then residential gateway monitoring and control software 212 will not permit the data to be communicated via the selected CPE interface. Control then returns to step 702.

Returning to step 724, if gateway monitoring and control software 212 determines that a "filter" command has not been received from user interface 110, then control passes back to step 702.

The example systems and methods described above are provided for illustrative purposes only and are not intended to limit the present invention. Persons skilled in the relevant art(s) based on the teachings provided herein will appreciate that each of the user interface commands discussed herein could be applied to any combination of CPE devices and voice, video and computer data streams. Furthermore, the functions that may be supported by a system for residential gateway monitoring and control in accordance with the present invention are not limited to those exemplary functions provided in Table 1, above. Rather, persons skilled in the relevant art(s) based on the teachings provided herein will appreciate that embodiments of the present invention will support monitoring, mixing, routing, and control functions beyond those listed in Table 1.

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A residential gateway, comprising:
a processor configured to receive data from an external network, to generate from said data a first data stream of a first data type and a second data stream of a second data type, to provide said first data stream to a first external customer premises equipment (CPE) device, and to provide said second data stream to a second external customer premises equipment (CPE) device, wherein said second data type is different from said first data type;
wherein said processor is further configured to receive a first command from said first CPE device and, in response to receiving said first command, to provide a copy of said second data stream to said first CPE device by multiplexing said copy of said second data stream with said first data stream.

2. The residential gateway of claim 1, wherein said first data type comprises computer data and said second data type comprises video signals.

3. The residential gateway of claim 1, wherein said first data type comprises video signals and said second data type comprises computer data.

4. The residential gateway of claim 1, wherein said first data type comprises computer data and said second data type comprises voice information.

5. The residential gateway of claim 1, wherein said first data type comprises video signals and said second data type comprises voice information.

6. The residential gateway of claim 1, wherein said processor is further configured to receive a second command from said first CPE device and, in response to receiving said second command, to cease providing said second data stream to said second CPE device.

7. The residential gateway of claim 1, wherein said processor is further configured to receive a second command from said first CPE device and, in response to receiving said second command, to provide a data stream to said second CPE device other than said second data stream.

8. The residential gateway of claim 1, wherein said processor is further configured to convert said copy of said second data stream to said first data type prior to multiplexing said copy of said second data stream with said first data stream.

9. The residential gateway of claim 1, wherein said processor is connected to said network via a cable modem.

10. The residential gateway of claim 1, wherein said processor is connected to said network via an xDSL connection.

11. A method for controlling a residential gateway, comprising:
(a) receiving data from a network;
(b) generating a first data stream of a first data type from said data;
(c) generating a second data stream of a second data type from said data, wherein said second data type is different from said first data type;
(d) providing said first data stream to a first customer premises equipment (CPE) device;
(e) providing said second data stream to a second customer premises equipment (CPE) device;
(f) receiving a first command from said first CPE device; and
(g) in response to receiving said first command, providing a copy of said second data stream to said first CPE device by multiplexing said copy of said second data stream with said first data stream.

12. The method of claim 11, wherein step (b) comprises generating a first data stream of computer data, and step (c) comprises generating a second data stream of video signals.

13. The method of claim 11, wherein step (b) comprises generating a first data stream of video signals and step (c) comprises generating a second data stream of computer data.

14. The method of claim 11, wherein step (b) comprises generating a first data stream of computer data and step (c) comprises generating a second data stream of voice information.

15. The method of claim 11, wherein step (b) comprises generating a first data stream of video signals and step (c) comprises generating a second data stream of voice information.

16. The method of claim 11, further comprising:
receiving a second command from said first CPE device; and
in response to receiving said second command, ceasing to provide said second data stream to said second CPE device.

17. The method of claim 11, further comprising:
receiving a second command from said first CPE device; and
in response to receiving said second command, providing a data stream to said second CPE device other than said second data stream.

18. The method of claim 11, further comprising:
converting said copy of said second data stream to said first data type prior to multiplexing said copy of said second data stream with said first data stream.

19. The method of claim 11, wherein step (a) comprises receiving data from a network via a cable modem.

20. The method of claim 11, wherein step (a) comprises receiving data from a network via an xDSL connection.

21. A non-transient computer-readable storage medium having stored thereon computer executable instructions, execution of which by a computing device causes the computing device to perform residential gateway control operations, the operations comprising:
receiving data from a network;
generating a first data stream of a first data type from said data;
generating a second data stream of a second data type from said data, wherein said second data type is different from said first data type;
providing said first data stream to a first customer premises equipment (CPE) device;
providing said second data stream to a second customer premises equipment (CPE) device;
receiving a first command from said first CPE device; and
providing, in response to receiving said first command, a copy of said second data stream to said first CPE by multiplexing said copy of said second data stream with said first data stream.

22. The computer-readable storage medium of claim 21, wherein said generating a first data stream of a first data type comprises generating a first data stream of computer data, and wherein said generating a second data stream of a second data type comprises generating a second data stream of video signals.

23. The computer-readable storage medium of claim 21, wherein said generating a first data stream of a first data type comprises generating a first data stream of video signals, and wherein said generating a second data stream of a second data type comprises generating a second data stream of computer data.

24. The computer-readable storage medium of claim 21, wherein said generating a first data stream of a first data type comprises generating a first data stream of computer data, and wherein said generating a second data stream of a second data type comprises generating a second data stream of voice information.

25. The computer-readable storage medium of claim 21, wherein said generating a first data stream of a first data type comprises generating a first data stream of video signals, and wherein said generating a second data stream of a second data type comprises generating a second data stream of voice information.

26. The computer-readable storage medium of claim 21, said operations further comprising:
receiving a second command from said first CPE device; and
in response to receiving said second command, ceasing to provide said second data stream to said second CPE device.

27. The computer-readable storage medium of claim 21, said operations further comprising:
receiving a second command from said first CPE device; and
in response to receiving said second command, providing a data stream other than said second data stream to said second CPE device.

28. The computer-readable storage medium of claim 21, said operations further comprising:
converting said copy of said second data stream to said first data type prior to multiplexing said copy of said second data stream with said first data stream.

29. The computer-readable storage medium of claim 21, wherein said receiving data from a network comprises receiving the data via a cable modem.

30. The computer-readable storage medium of claim 21, wherein said receiving data from a network comprises receiving the data via an xDSL connection.

31. A residential gateway, comprising:
processing means for receiving data from an external network, for generating from said data a first data stream of a first data type and a second data stream of a second data type, for providing said first data stream to a first external customer premises equipment (CPE) device, and for providing said second data stream to a second external customer premises equipment (CPE) device, wherein said second data type is different from said first data type;
gateway monitoring and control means for receiving a first command from said first CPE device and for providing, in response to receiving said first command, a copy of said second data stream to said first CPE device by multiplexing said copy of said second data stream with said first data stream.

32. The residential gateway of claim 31, wherein said first data type comprises computer data and said second data type comprises video signals.

33. The residential gateway of claim 31, wherein said first data type comprises video signals and said second data type comprises computer data.

34. The residential gateway of claim 31, wherein said first data type comprises computer data and said second data type comprises voice information.

35. The residential gateway of claim 31, wherein said first data type comprises video signals and said second data type comprises voice information.

36. The residential gateway of claim 31, wherein said gateway monitoring and control means includes means for receiving a second command from said first CPE device and, in response to receiving said second command, ceasing to provide said second data stream to said second CPE device.

37. The residential gateway of claim 31, wherein said gateway monitoring and control means includes means for receiving a second command from said first CPE device and, in response to receiving said second command, providing a data stream to said second CPE device other than said second data stream.

38. The residential gateway of claim 31, wherein said gateway monitoring and control means includes means for converting said copy of said second data stream to said first data type prior to multiplexing said copy of said second data stream with said first data stream.

39. The residential gateway of claim 31, wherein said processing means for receiving data from an external network comprises a cable modem.

40. The residential gateway of claim 31, wherein said processing means for receiving data from an external network comprises an xDSL connection.

41. A residential gateway, comprising:
a processor configured to receive data from an external network, to generate from said data a first data of a first data type and a second data stream different from the first data stream, to provide said first data stream to a first external customer premises equipment (CPE) device, and to provide said second data stream to a second external customer premises equipment (CPE) device, wherein said second data stream may be of the first data type or a second data type different from said first data type;
wherein said processor is further configured to receive a first command from a user interface associated with said first CPE device and, in response to receiving said first command, to provide a copy of said second data stream to said first CPE device by multiplexing said copy of said second data stream with said first data stream.

42. A method for controlling a residential gateway, comprising:
(a) receiving data from a network;
(b) generating from said data a first data stream of a first data type;
(c) generating from said data a second data stream different from said first data stream, wherein said second data stream may be of the first data type or a second data type different from said first data type;
(d) providing said first data stream to a first customer premises equipment (CPE) device;
(e) providing said second data stream to a second customer premises equipment (CPE) device;
(f) receiving a first command from a user interface associated with said first CPE device; and
(g) in response to receiving said first command, providing a copy of said second data stream to said first CPE device by multiplexing said copy of said second data stream with said first data stream.

43. A non-transitory computer-readable storage medium having stored thereon computer executable instructions, execution of which by a computing device causes the computing device to perform residential gateway control operations, the operations comprising:
receiving data from a network;
generating from said data a first data stream of a first data type;
generating from said data a second data stream different from said first data stream, wherein said second data stream may be of the first data type or a second data type different from said first data type;
providing said first data stream to a first customer premises equipment (CPE) device;
providing said second data stream to a second customer premises equipment (CPE) device;
receiving a first command from said first CPE device; and
in response to receiving said first command, providing a copy of said second data stream to said first CPE by multiplexing said copy of said second data stream with said first data stream.

44. A residential gateway, comprising:
processing means for receiving data from an external network, for generating from said data a first data stream of a first data type and a second data stream different from the first data stream, for providing said first data stream to a first external customer premises equipment (CPE) device, and for providing said second data stream to a second external customer premises equipment (CPE) device, wherein said second data stream may be of the first data type or a second data type different from said first data type;
gateway monitoring and control means for receiving a first command from a user interface associated with said first CPE device and for providing, in response to receiving said first command, a copy of said second data stream to said first CPE device by multiplexing said copy of said second data stream with said first data stream.

* * * * *

UNITED STATES PATENT AND TRADEMARK OFFICE
CERTIFICATE OF CORRECTION

| | | |
|---|---|---|
| PATENT NO. | : 8,300,648 B2 | Page 1 of 1 |
| APPLICATION NO. | : 12/263412 | |
| DATED | : October 30, 2012 | |
| INVENTOR(S) | : Charles E. Anderson, IV | |

It is certified that error appears in the above-identified patent and that said Letters Patent is hereby corrected as shown below:

Column 17, line 20, please replace "data of" with --data stream of--.

Signed and Sealed this
Twenty-second Day of January, 2013

David J. Kappos
*Director of the United States Patent and Trademark Office*